United States Patent [19]

Kooiman

[11] Patent Number: 4,572,000
[45] Date of Patent: Feb. 25, 1986

[54] PRESSURE SENSOR WITH A SUBSTANTIALLY FLAT OVERPRESSURE STOP FOR THE MEASURING DIAPHRAGM

[75] Inventor: Robert R. Kooiman, Eden Prairie, Minn.

[73] Assignee: Rosemount Inc., Eden Prairie, Minn.

[21] Appl. No.: 559,894

[22] Filed: Dec. 9, 1983

[51] Int. Cl.[4] .............................................. G01L 9/12
[52] U.S. Cl. ..................................... 73/718; 73/706; 73/724; 361/283
[58] Field of Search ................ 73/718, 720, 721, 722, 73/724, 706; 361/283

[56] References Cited

U.S. PATENT DOCUMENTS

| | | | |
|---|---|---|---|
| 3,239,827 | 3/1966 | Werner et al. | 340/236 |
| 3,618,390 | 11/1971 | Frick | 73/398 |
| 4,091,682 | 5/1978 | Abbott et al. | 73/702 |
| 4,163,395 | 8/1979 | Medlar et al. | 73/720 |
| 4,207,604 | 6/1980 | Bell | 361/283 |
| 4,257,274 | 3/1981 | Shimada et al. | 73/718 |
| 4,306,460 | 12/1981 | Sakurai et al. | 73/721 |
| 4,388,833 | 6/1983 | Kuwayama | 73/718 |
| 4,398,194 | 8/1983 | Johnston | 73/718 |

FOREIGN PATENT DOCUMENTS

| | | | |
|---|---|---|---|
| 0111348 | 6/1984 | European Pat. Off. | |
| 1558770 | 1/1980 | United Kingdom | 73/720 |

OTHER PUBLICATIONS

IEEE Transactions on Electron Devices, vol. Ed.-27, No. 5, May, 1980, pp. 927-930.
Behr, M. and J. Giachino, "A Miniature Pressure Sensor for Automotive Applications," I Mech. E. Conference Pub. 1981-10 (1981), presented at The Third International Conference on Automotive Electronics at London in Oct. 1981.
Drawing "CPT-II" (FIG. 6.3) acknowledged as prior art.

Primary Examiner—Donald O. Woodiel
Attorney, Agent, or Firm—Kinney & Lange

[57] ABSTRACT

A transducer for sensing pressure has a first and a second pressure chamber for sensing pressure and a center stop which has two substantially flat faces, each face cooperating with an associated sensor diaphragm which forms the first and the second pressure chamber. The two chambers are fluidically coupled together. Each of the diaphragms is responsive to a pressure P1 or P2 respectively and the transducer is easily configured to sense differential, gage or absolute pressure. When the pressure to be sensed exceeds a predetermined value the affected sensing diaphragm is supported by the respective substantial flat face of the center stop.

14 Claims, 3 Drawing Figures

PRESSURE SENSOR WITH A SUBSTANTIALLY FLAT OVERPRESSURE STOP FOR THE MEASURING DIAPHRAGM

BACKGROUND OF THE INVENTION

The invention relates to gage, absolute and differential pressure transducers.

Many useful transducer designs are known such as U.S. Pat. No. 3,618,390 and U.S. Pat. No. 4,398,194. Many designs use a prestretched diaphragm as taught in '390 patent, but most diaphragms are in a flat position as at rest when the minimum pressure or a zero differential pressure is applied to such diaphragm. Contrary to such teachings the instant invention provides sensing diaphragms which are flat when an excessive pressure is applied thereto. The simplicity of manufacture and ease of assembly of such transducer is apparent from the hereafter disclosed invention.

SUMMARY OF THE INVENTION

The invention preferably provides a nonmetallic transducer for sensing gage, absolute or differential pressure with very minimal changes. The transducer includes a housing which has a center stop disposed therein. The center stop has a substantially flat first face and a substantially flat second face each of which respectively cooperate with a first sensing diaphragm and a second sensing diaphragm to form a first pressure chamber and a second pressure chamber. The center stop includes a passageway means therethrough for fluidically coupling the first chamber to the second chamber and for inserting and sealing a fluid to a predetermined pressure in the chambers and the passageways. The diaphragms are open to pressure and deflect responsive thereto. The diaphragms are constructed from a substantially nonhysteretic, brittle, nonmetallic material such as silicon (single crystal or crystalline), sapphire or quartz. The diaphragms are disposed on the center stop such that when the magnitude of the pressure acting on one of the diaphragms exceeds a predetermined maximum, the diaphragm responsive to that over pressure is substantially supported on the respective flat face of the center stop.

The unique configuration of the diaphragms with respect to the center stop provides for ease in manufacturing and assembly as such diaphragms are manufactured flat and no prestretch or prestress is required when the diaphragm is affixed to the center stop of the transducer. The materials of the transducer construction have high thermal conductivity and extremely low inelastic mechanical characteristics, hence, the accuracy and stability of the transducer are excellent. For measurement of pressure under widely varying temperature conditions, a temperature sensor is disposed for measurement of the transducer temperature and the temperature data therefrom is used to compensate for repeatable measurement errors in the readout circuitry. Other advantages are apparent in the description of the preferred embodiment of the invention.

DETAILED DESCRIPTION OF THE PREFERRED EMBODIMENTS

Figure 1:
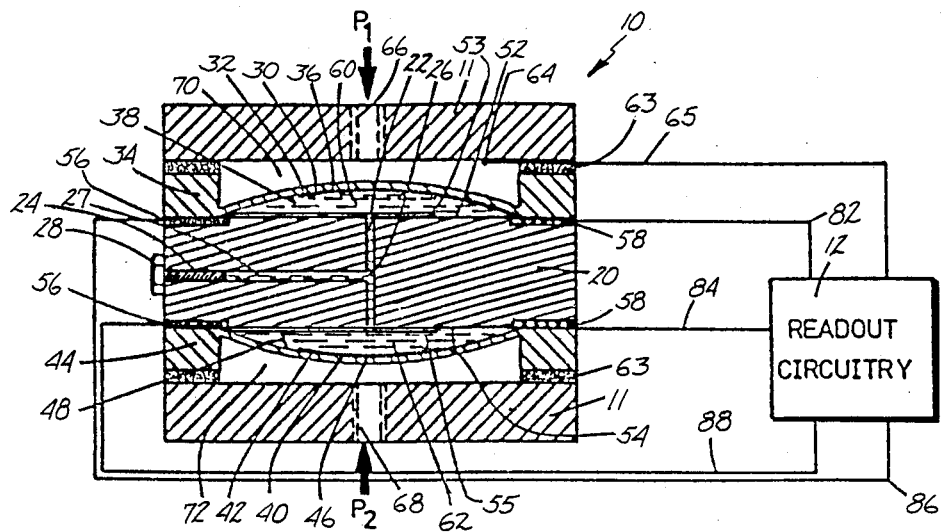
FIG. 1 is a side elevation, sectional view of a transducer in accord with the invention showing a capacitive sensing means and showing an electrical circuit in block diagram form.

A pressure transducer is shown generally at 10 and includes a pressure housing 11 and readout circuitry 12 which is schematically shown. Housing 11 and readout circuitry 12 preferably are disposed in a suitable enclosure. A center stop plate 20 formed from a suitable block of material has a first bore 22 therethrough and a second bore 24 which is generally transverse to first bore 22. First bore 22 is shown as a singular bore. However, a plurality of such bores can also be used, as desired. Second bore 24 extends inwardly from the edge of stop plate 20 and intersects with first bore 22 at junction 26 such that bores 22 and 24 together form a passageway 27 for fluid in plate 20. A sealing means 28 such as a plug or screw, as shown, can be used for sealing the end of passageway 27 or a pinch off tube may be coupled to passageway 27 for conveniently filling passageway 27 and the associated cavities (which are hereinafter described) with a suitable fluid, such as a substantially noncompressible liquid or a gas and for sealing same.

Transducer 10 has a first diaphragm assembly 30 and a second diaphragm assembly 40. Assemblies 30 and 40 preferably are each formed from a block of the same material. First diaphragm assembly 30 has a thin first diaphragm 32 and an integral peripheral spacer 34.

Figure 2:
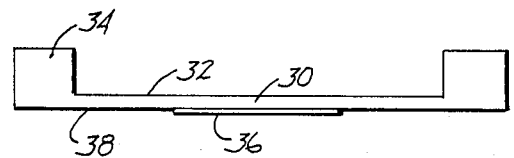
FIG. 2 is a side elevation, sectional view of the diaphragm assembly of the transducer in accord with the invention.

Similarly, second diaphragm assembly 40 has a thin, second diaphragm 42 and an integral, peripheral spacer 44. Center stop plate 20 and diaphragm assemblies 30 and 40 preferably are formed from silicon, quartz, sapphire or other suitable material, preferably a substantially nonhysteretic, brittle, nonmetal. These materials are known for their excellent elastic properties under stress due to deflection responsive to the pressure to be applied. The thin diaphragms 32, 34 preferably are formed by machining, etching or other known methods. Referring to FIG. 2 it is observed that at rest diaphragms 32 and 42 of diaphragm assemblies 30, 40 are flat. Hence, the diaphragms 32, 42 are easily formed in diaphragm assemblies 30, 40.

In the embodiment of FIG. 1, wherein the sensing means of the transducer is shown as capacitive, thin, electrically conductive layers 36, 46 of material such as a metal, are deposited on the faces 38 and 48 of first diaphragm 32 and second diaphragm 42, respectively. The layers 36 and 46 of material can be deposited by sputtering or vapor deposition or the like. A thin, electrically conductive layer of material is similarly disposed on a first surface 52 at 53 and on a second surface 54 of center stop plate 20 at 55. The thin, electrically conductive layers 53, 55 of material preferably are in the order of a few microns or less in thickness. In order to insure that faces 38, 48 of diaphragms 32 and 42, and first and second surfaces 52, 54 of stop plate 20 are substantially flat such faces and surfaces may be etched or machined to have shallow recesses for receiving the conductive layers such that when the respective layer of conductive material is disposed thereon, the diaphragm or faces are substantially flat. Since the conductive layers are very thin forming such recesses for the layers is not necessary under most conditions of operation. In some cases it is desirable to first deposit or grow a thin-conductive layer such as an oxide and then deposit the conductive layers.

First diaphragm assembly 30 and second diaphragm assembly 40 are then mated to center stop plate 20 as shown. Center stop plate 20 and the assemblies 30, 40 preferably are all cylindrical, but can have other suitable general geometric peripheral configurations provided that all are symmetrical with each other. When formed from quartz the assemblies 30, 40 and the center stop plate 20 preferably are joined as by fusing about their peripheries as shown at 56, or when formed from silicon or sapphire, they can be joined at 56 by a suitable bonding material, such as glass, or by a gold eutectic for example, which is suitable for bonding silicon. When glass bonding is used a slight recess 58 in center stop plate 20 may be advantageous to enhance such bonding. A substantially flat interface of the sensing diaphragms 32, 42 and the faces 52, 54 respectively of the center stop plate 20 is thus provided.

When first assembled to the center stop plate 20 the surfaces 38 and 48 of first diaphragm 32 and second diaphragm 42 rest substantially on the substantially flat first face 52 and the substantially flat second face 54, respectively. A suitable fluid under pressure is inserted through second bore 24 into passageway 27 through bore 22 which forms a portion of passageway 27. Standard techniques of evacuation followed by backfilling are employed to ensure homogeneity of the filling fluid. The first diaphragm 32 and the second diaphragm 42 are urged by the filling fluid away from first face 52 and second face 54 respectively. The outward deflection away from faces 52, 54 of center stop plate 20, of diaphragms 32, 42 responsive to the fluid fill is exaggerated in FIG. 1 for illustrative purposes. Actual deflection from faces 52, 54 respectively is typically less than the thickness of the diaphragms 32 and 34. The fluid volume used for filling is computed for the maximum pressure, (gage, absolute or differential) to be measured at the lowest expected temperature. When the desired volume is attained sealing means 28 is secured by seating against stop plate 20 or by suitable bonding means such as fusing, thus enclosing the fluid in a first cavity 60 formed by now convex face 38 of first diaphragm assembly 30, a second cavity 62 formed by the now convex face 48 of the second diaphragm assembly 40 and passageway 27. Both cavities 60, 62 are fluidically coupled to each other through passageway 27. One method of filling cavities 60, 62 and passageway 27 is to apply a desired pressure to the outer surfaces of diaphragms 32, 42 while inserting the fluid. When the diaphragms 32, 42 are slightly deflected from their stopped position on its respective face 52, 54 the sealing means can then be secured. Note that final adjustment of the oil volume under diaphragms 32 and 42 can be accomplished by positioning of the sealing means 28 before it is secured. Another suitable method, not shown; is to insert a metallic capillary tube into passage 56 and to progressively pinch it off until the desired pressure is attained under diaphragms 32 and 42.

Housing 11 is then formed by disposing housing sections on each side of the first diaphragm assembly 30 and the second diaphragm assembly 40 along junctions 63. The housing sections are bonded to spacers 34, 44 in a desired manner. If the housing 11 is formed from quartz such bonding is again preferably by fusing. When all components of transducer 10 are formed from quartz and are bonded by fusing differential thermal expansion stresses are virtually eliminated.

A temperature sensor 64 disposed on housing 11 provides information for correction in the readout circuitry 12 through leadwires 65 of repeatable measurement errors caused by widely varying temperatures, such as fluid expansion characteristics, dielectric changes of the fluid fill when the sensing means is a capacitor, modulus of elasticity changes and dimension changes. This correction results in a very accurate readout which is attained because of the advantages of the high elastic characteristics and mechanical stability of the transducer components.

Housing 11 is fitted with a first pressure port 66 which opens to a first pressure source providing a pressure P1 and a second pressure port 68 providing a pressure P2. It is noted that pressure ports 66, 68, along with the associated sections of housing 11 and the respective diaphragm assemblies 30, 40 form a first pressure chamber 70 and a second pressure chamber 72. Hence, first pressure P1 is then applied to first diaphragm 32 and second pressure P2 is applied to second diaphragm 42. Either pressure port 66 or 68 can be used to evacuate and seal its respective pressure chamber 70, 72, or be left open to P1 or P2, as shown. Hence the sensor may be adapted for absolute, gage or differential pressure measurements.

In the embodiment of FIG. 1 for differential pressure sensing, pressures P1 and P2 act on diaphragms 32 and 42, respectively. Responsive to pressure each diaphragm is urged to deflect responsive to the pressure on each side of the diaphragm. Any deflection of diaphragm 32 toward stop plate 20 caused by the pressure P1 causes the fluid in the first and second cavities 60, 62 to tend to deflect diaphragm 42 away from face 54, if P2 is less than P1. Basically, the diaphragms in such embodiment are responsive to the differential pressure (P1−P2).

The deflection of diaphragm 32 relative to face 52 is measured as a first capacitance (C1) as formed by conductive layer 36 on diaphragm 32 forming one capacitor plate and the conductive layer 53 on first face 52 forming a second capacitor plate for capacitance C1. The deflection of diaphragm 42 from face 54 is measured as a second capacitance (C2), as formed by the conductive layer 46, forming one capacitor plate and the conductive layer 55 on first surface 54 forming a second capacitor plate for capacitive C2. Suitable electrical leads 82, 84, 86, 88 are electrically connected to layer 36, layer 46, layer 53 and layer 55, respectively, and are connected to readout circuitry 12 in a conventional manner as by etching a path on the diaphragm assemblies 30, 40, and the center spot plate 20 from the conductive layers 36, 46, 53, 55, depositing a conductive material in such path to the periphery of the transducer and coupling leadwires thereto in a conventional manner. A suitable nonconductive layer can then be deposited over the conductive material in such paths as desired.

Pressure or differential pressure, depending on the transducer configuration, is then calculated in the readout circuitry 12 by conventional circuitry as a function of capacitors C1, C2. Capacitive signals from both the capacitors formed by the sensing diaphragms 32, 42 are preferably used for pressure measurements, however only one diaphragm need be measured if desired and representative pressure measurements can still be achieved. Electrical signals from temperature sensor 64 are used to compensate in the readout circuitry 12 for known, systematic temperature induced errors. While the sensing means shown in FIG. 1 and as discussed has been a capacitive sensing means, it is to be understood that the pick off or sensing means can be inductive, piezoresistive, piezoelectric, acoustic surface wave sensing measurement, or optical without departing from the scope of the invention. Such sensing means can be disposed on the diaphragms 32 and 42 in a conventional manner as desired. Piezoresistive paths may be readily employed in silicon diaphragms without departing from the scope of this invention.

Figure 3:
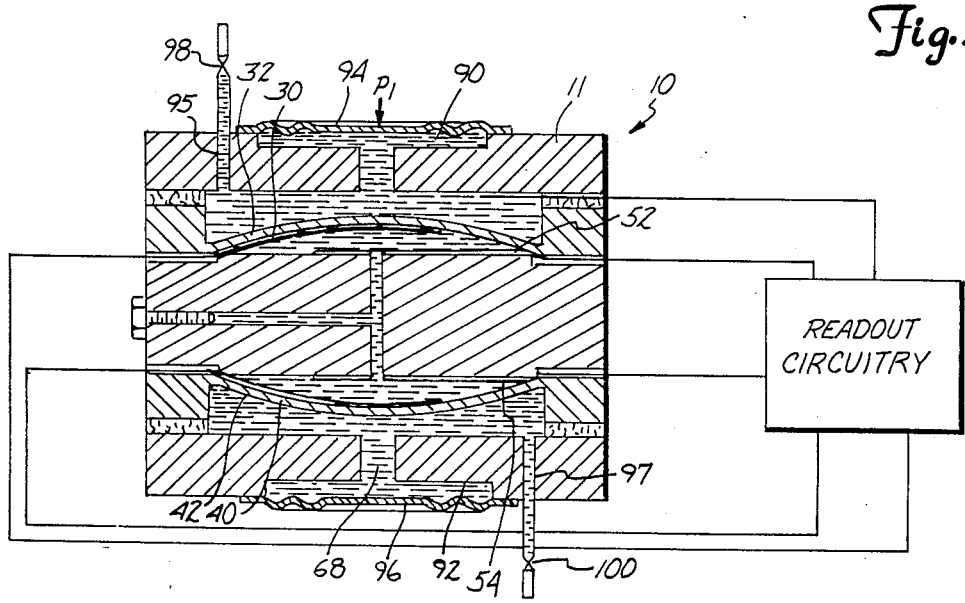
FIG. 3 is a side elevation, sectional view of a transducer in accord with the invention showing an electrical circuit in block diagram form and also showing isolator diaphragms and isolator chambers in accord with the invention.

A further preferred embodiment of the invention is shown in FIG. 3. Housing 11 has cavities 90, 92 formed therein on the outer end surfaces, and across cavities 90, 92, isolation diaphragms 94, 96 respectively are disposed. Isolation diaphragms 94, 96 together with the cavities 90, 92, the pressure ports 66, 68 and the rims 34 and 44 to the outer sides of the first diaphragm assemblies 30, 40 respectively enclose second and third isolation chambers. The isolation chambers are preferably filled with noncompressible fluid, which may be introduced through bores 95, 97 in housing 11 with a suitable seal off devices 98, 100. Such isolators 94, 96 then are open to pressure sources having pressures P1 and P2 respectively.

Such isolators are desirable for measuring pressure of fluids which might otherwise chemically attack or affect the sensing diaphragms 32, 42. Fluid fill volume for the isolator chambers is predetermined such that upon over pressure of P1 or P2 first diaphragm 32 or second diaphragm 42 bottoms out on first face 52 or second face 54, respectively, to protect both the associated isolation diaphragm 94, 96 and the sensing diaphragm 32, 42 from excessive stresses. The isolators should be considerably less resistant to deflection than the diaphragms 32 and 42 for best accuracy and this is commonly accomplished by corrugating them as shown, by using thinner material, by using material of lower modulous of elasticity or by using a larger diameter, all with respect to the diaphragms 32 and 42.

In yet a further preferred embodiment, if the isolation diaphragms are not provided, suitable chemically inactive material may be deposited on the side of diaphragms 32, 42 open to passageways 66 and 68 and also the other internal surfaces of cavities 70 and 72 to impede chemical attack thereon.

The transducer described herein can withstand extreme overpressures from either or both of P1 and P2. Overpressure protection from one of P1 and P2 is achieved through support of its respective diaphragm against a flat surface and overpressure applied simultaneously from both P1 and P2 is provided through the fluid coupling. In either case the deflection of diaphragms 32 and 42 is restricted to the transducer design range.

What is claimed is:

1. A transducer for sensing a magnitude of a first pressure and having a first pressure chamber and a second pressure chamber for sensing at least the magnitude of the first pressure comprising:
   a housing;
   center stop means on the housing and having a substantially flat first face for providing a portion of the first pressure chamber and a substantially flat second face for providing a portion of the second pressure chamber, respectively.
   first sensor diaphragm means open and responsive to said first pressure supported on the center stop means for enclosing, with the first face, the first pressure chamber, said first diaphragm means having a substantially flat surface contacting the flat first face at a substantially unstressed condition;
   second sensor diaphragm means supported on the center stop means for enclosing, with the second face, the second pressure chamber;
   passageway means provided in the center stop means for fluidically coupling the first pressure chamber to the second pressure chamber such that when the magnitude of a first pressure exceeds a predetermined magnitude the first sensor diaphragm is supported by the first face of the center stop means;
   a filling of substantially noncompressible fluid in the passageway means and in both the first and second chambers to bow both the first and second sensing diaphragm means away from the respective first and second faces with substantially equal external pressures on the first and second diaphragm means; and
   sensing means for sensing the deflection of at least one of the diaphragm means.

2. A transducer according to claim 1 wherein the noncompressible fluid filling the passageway means and the first and second chamber is under a predetermined pressure selected as a function of the maximum expected pressure at the lowest expected temperature.

3. A transducer according to claim 2 further comprising a first sensor and a second sensor.

4. A transducer according to claim 2 wherein the transducer further comprises first isolator means interposed between the first sensor diaphragm and the first pressure and fluidically coupled thereto such that the first pressure causes deflection of the isolator means and such that responsive to such deflection the fluidic coupling causes the first sensor diaphragm to deflect responsive to said first pressure.

5. A transducer according to claim 1 further comprising first isolator chamber means and second isolator chamber means, each such chamber means being fluidically coupled respectively to the first sensor diaphragm means and the second sensor diaphragm means, the first isolator chamber means being responsive to the first pressure, and the second isolator chamber means responsive to the second pressure, the fluidic coupling from the first isolator chamber affecting the first sensor diaphragm means and the fluidic coupling from the second isolator chamber affecting the second sensor diaphragm means, and differentials in the pressures acting on the first and the second isolator chamber causing the first and second sensor diaphragm means to be displaced responsive to such differential in pressure.

6. A transducer according to claim 1 wherein the sensing means comprises a capacitor formed by an electrical conductive surface portion of the first face and second capacitor plate formed by an electrically conductive surface portion of the first diaphragm means.

7. A transducer according to claim 1 wherein the sensing means is a first capacitor formed by conducting surfaces of the first face and the first diaphragm means for measuring a first capacitance and a second capacitor formed by conducting surfaces of the second face and the second diaphragm means for measuring a second capacitance.

8. The transducer of claim 1 wherein the diaphragms are each formed with an annular rim around the edges thereof, the diaphragms being fastened to the stop means at a portion thereof aligned with the rims.

9. The transducer of claim 8 wherein the rims extend in direction away from the respective faces of the plate, the housing being fastened to the rim of at least the first diaphragm.

10. The transducer of claim 8 wherein the diaphragm is formed of a brittle nonmetal having properties substantially equivalent to silcon.

11. A pressure transducer comprising:
a plate having oppositely facing generally flat surfaces and an outer peripheral edge portion;
a first sensor diaphragm sealingly fastened at its edges to the edge portion of the plate and overlying one of the oppositely facing surfaces, the first diaphragm initially being configured to have a flat face which, when fastened to the plate is substantially contiguous with such one surface;
a second diaphragm sealingly fastened at its edges to the edge portions of the plate on the opposite surface of the plate and overlying a fluid passageway defined in the plate said fluid passageway extending between the oppositely facing surfaces of the plate within the space defined by the edges of the first and second diaphragms;
a filling of substantially noncompressible fluid filling the passageway and of volume to move both of the diaphragms away from their respective surfaces of the plate to form fluid filled chambers;
a housing overlying the first diaphragm and including means to introduce a pressure to be sensed into the housing to tend to deflect the first diaphragm toward the plate which deflection is resisted by the second diaphragm through the incompressible fluid between the diaphragms; and
means to permit sensing deflection of at least the first diaphragm.

12. The transducer of claim 11 wherein at least the first diaphragm comprises a brittle material diaphragm having the flat face formed across one entire side of the diaphragm.

13. The transducer of claim 12, and a rim member around the peripheral edges of the first diaphragm, the first diaphragm being sealingly fastened to the plate at locations aligned with the rim.

14. The transducer of claim 13 wherein said rim is of substantially greater height in direction perpendicular to the diaphragm than the thickness of the diaphragm.

* * * * *

UNITED STATES PATENT AND TRADEMARK OFFICE
CERTIFICATE OF CORRECTION

PATENT NO. : 4,572,000

DATED : February 25, 1986

INVENTOR(S) : Robert R. Kooiman

It is certified that error appears in the above-identified patent and that said Letters Patent is hereby corrected as shown below:

In col. 3, line 5, "thin-conductive" should read --non-conductive--.

In col. 7, line 10, "silcon" should read --silicon--.

Signed and Sealed this

Twenty-fourth Day of June 1986

[SEAL]

Attest:

DONALD J. QUIGG

Attesting Officer

Commissioner of Patents and Trademarks